US005638117A

United States Patent [19]

Engeldrum et al.

[11] Patent Number: 5,638,117

[45] Date of Patent: Jun. 10, 1997

[54] INTERACTIVE METHOD AND SYSTEM FOR COLOR CHARACTERIZATION AND CALIBRATION OF DISPLAY DEVICE

[75] Inventors: Peter Engeldrum, Winchester, Mass.; William Hilliard, San Francisco, Calif.

[73] Assignee: Sonnetech, Ltd., San Francisco, Calif.

[21] Appl. No.: 338,041

[22] Filed: Nov. 14, 1994

[51] Int. Cl.⁶ .................................................. H04N 17/00
[52] U.S. Cl. .............................................. 348/179; 345/904
[58] Field of Search .................................. 345/150, 132, 345/147, 153, 904; 348/178, 179, 656

[56] References Cited

U.S. PATENT DOCUMENTS

| | | | |
|---|---|---|---|
| 2,854,505 | 9/1958 | Davis | 348/179 |
| 2,904,625 | 9/1959 | Allen | 348/179 |
| 2,931,856 | 4/1960 | Davis et al. | 348/179 |
| 4,106,846 | 8/1978 | Russin | 348/179 |
| 4,607,188 | 8/1986 | Brennesholtz | 348/179 X |
| 4,802,007 | 1/1989 | van Der Burg | 348/179 |
| 5,424,754 | 6/1995 | Bar et al. | 345/150 |
| 5,512,961 | 4/1996 | Cappels, Sr. | 348/658 |

*Primary Examiner*—Mark R. Powell
*Attorney, Agent, or Firm*—Stuart P. Meyer, Esq.

[57] ABSTRACT

A system and method of characterizing the colors displayed on a display device and calibrating the display device is disclosed. A series of images are displayed to the user, and the user selects portions of the image that match other portions, that match characteristics of a matching card juxtaposed to the display device or that meet other criteria.

18 Claims, 6 Drawing Sheets

INTERACTIVE METHOD AND SYSTEM FOR COLOR CHARACTERIZATION AND CALIBRATION OF DISPLAY DEVICE

BACKGROUND OF THE INVENTION

This invention relates generally to computer displays, and particularly to a system and method of characterizing and adjusting color rendition on a video display monitor.

The physical and electrical characteristics of color display monitors are sufficiently variable that even among monitors of the same type, color rendition varies significantly from device to device. Ambient lighting further affects the perceived color produced by a monitor. It is desirable in many applications of such monitors that images appear with the same perceived color for various users of various monitors in various ambient lighting conditions.

Accordingly, a number of techniques have been applied to achieve uniform color rendition across monitors and lighting conditions. In common techniques, devices known as colorimeters, photometers, or spectroradiometers are used to measure the output from a monitor, and the characteristics of the monitor or the data applied to the monitor are modified to provide a desired color rendition. However, these devices are expensive and must themselves be calibrated. Furthermore, the modification process typically does not lend itself to being performed by an ordinary end user of the equipment.

There remains a need for a simple and inexpensive device and method to permit characterization and modification of the output of a color monitor so as to achieve desired output characteristics.

SUMMARY OF THE INVENTION

In accordance with the present invention, a system and method for determining color rendition in an imaging device includes use of a contrast reference that provides a black reference area and a white reference area, a gamma reference that provides a halftone reference area and a continuous tone reference area, a black point reference that provides another black reference area and a color intensity reference area, a white point color temperature reference providing another white reference area, and a matching card having known visual characteristics for comparing with one of the references.

In another aspect of the invention, the references are images produced by the imaging device.

In yet another aspect of the invention, characteristics of the imaging device are modified based on comparison of the areas in the references and based on comparison of the matching card and the areas in the references.

In still another aspect of the invention, the comparisons are performed by interactively presenting the references to a user and recording subregions in the references that the user identifies as having similar characteristics to other subregions.

In a further aspect of the invention, characteristics of the monitor are modified in response to the results of the comparisons.

DETAILED DESCRIPTION OF THE DRAWINGS

The Figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
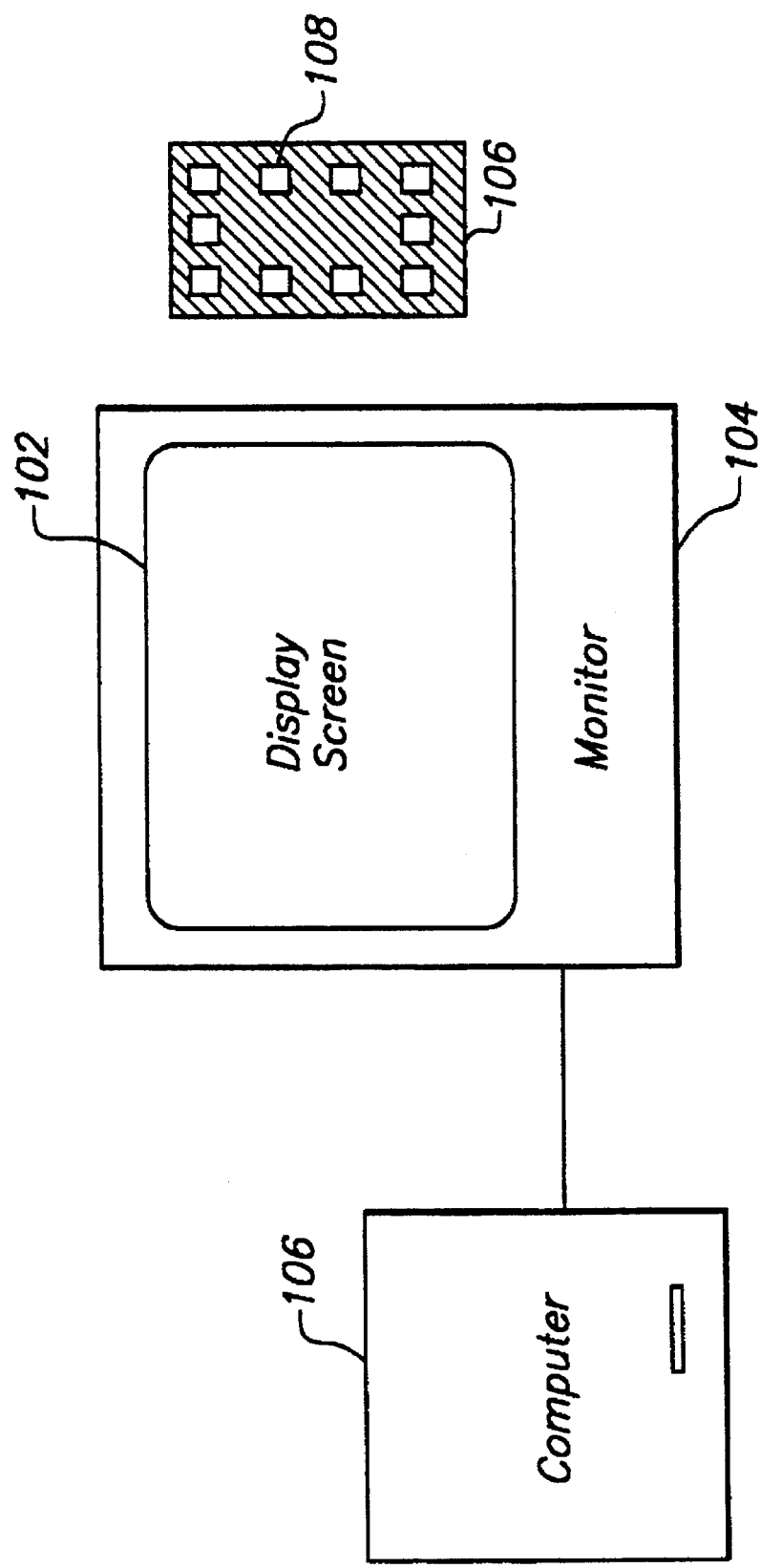
FIG. 1 is a block diagram of apparatus in accordance with the present invention.

Referring now to FIG. 1, there is shown apparatus in accordance with one embodiment of the present invention. A display monitor 104, including a display screen 102, is connected to a computer 106. In this embodiment, display monitor 104 is conventional as is computer 106, except for programming for operation as described below. A matching card 106 having known visual characteristics includes a number of cutouts, e.g., 108 such that when card 106 is placed over screen 102 as described below, the visual characteristics of card 106 and of an image displayed by screen 102 may be viewed in juxtaposition.

In accordance with the present invention, the human visual system is used to detect color differences and select color matches among a series of choices. The user is presented with reference images containing regions having different visual characteristics, and makes comparisons among those regions. In addition, a matching card, e.g., card 106, or multiple matching cards are employed to allow the user to compare characteristics of such cards with visual characteristics provided by the monitor 104.

Figure 2:
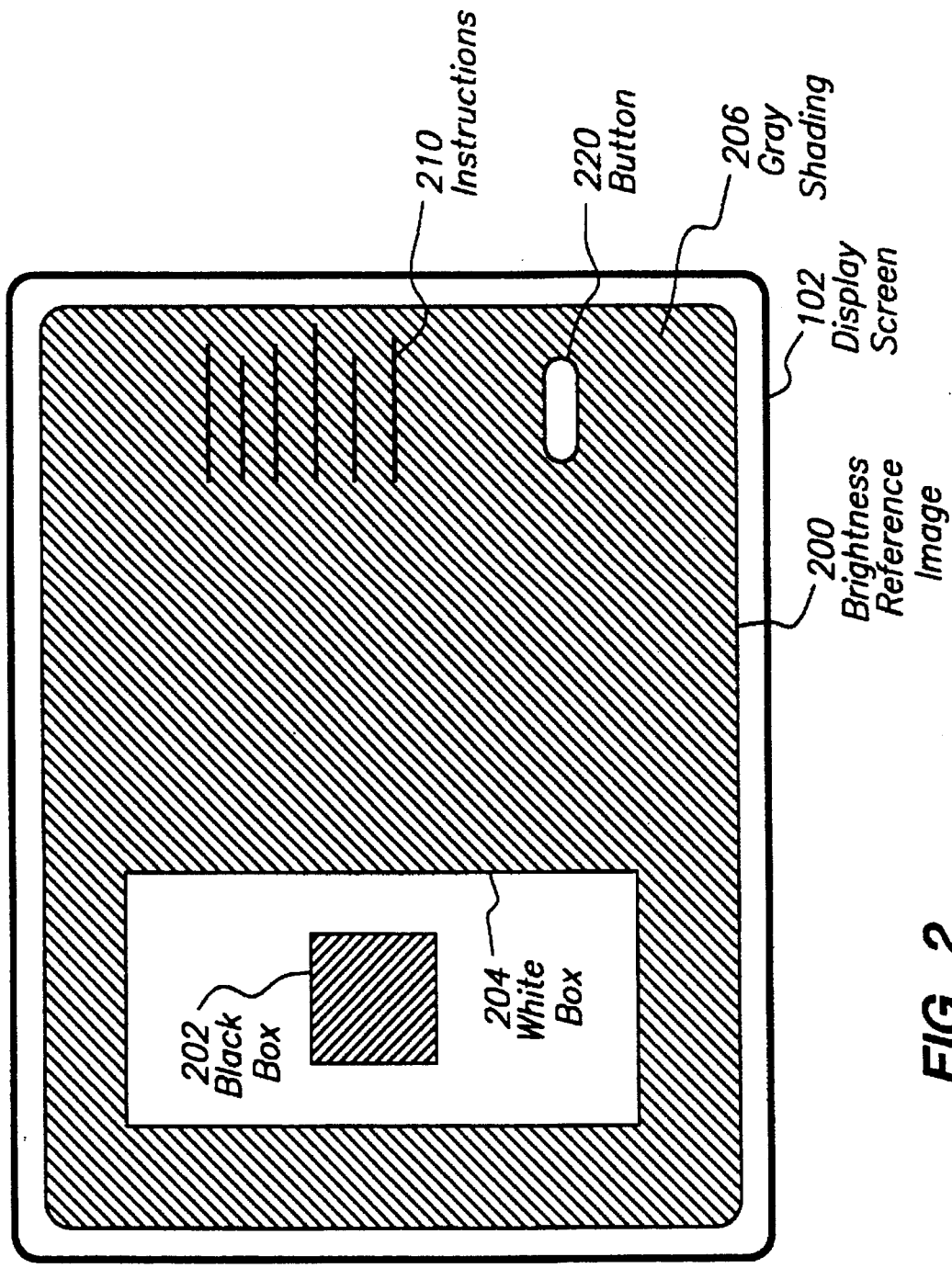
FIG. 2 illustrates a brightness reference image in accordance with the present invention.

Referring now to FIG. 2, there is shown a contrast reference image 200 that is displayed on display screen 102. Image 200 includes a black box 202, a white box 204, a gray shaded background area 206, instructions 210, and a button 220.

As a preliminary step in characterizing or calibrating monitor 104, the brightness or "cutoff voltage" of the monitor 104 is set to a value that will maximize the number of visible colors that can be displayed. If this value is not initially set, the number of displayable colors will be limited. Furthermore, typical monitors suffer the undesirable property that maximum screen luminance varies inversely with average beam current or space-averaged luminance of data displayed on the screen. Therefore, brightness reference image 200 provides a reference black box 202, a reference white box 204, and a predominantly gray shaded background 206 to allow setting of brightness control under such "normal" display conditions and corresponding average beam current.

Instructions 210 tell the user to turn on the room lights, to set the brightness and contrast (or "video gain") controls of monitor 102 to maximum, and then to adjust the brightness control of monitor 102 to achieve bright white in white box 204 while maintaining black box 202 as black as possible. When the user has completed this adjustment, the user positions a conventional cursor (e.g., by use of a conventional "mouse" pointing device not shown) over button 220 and clicks the mouse button to continue.

Figure 3:
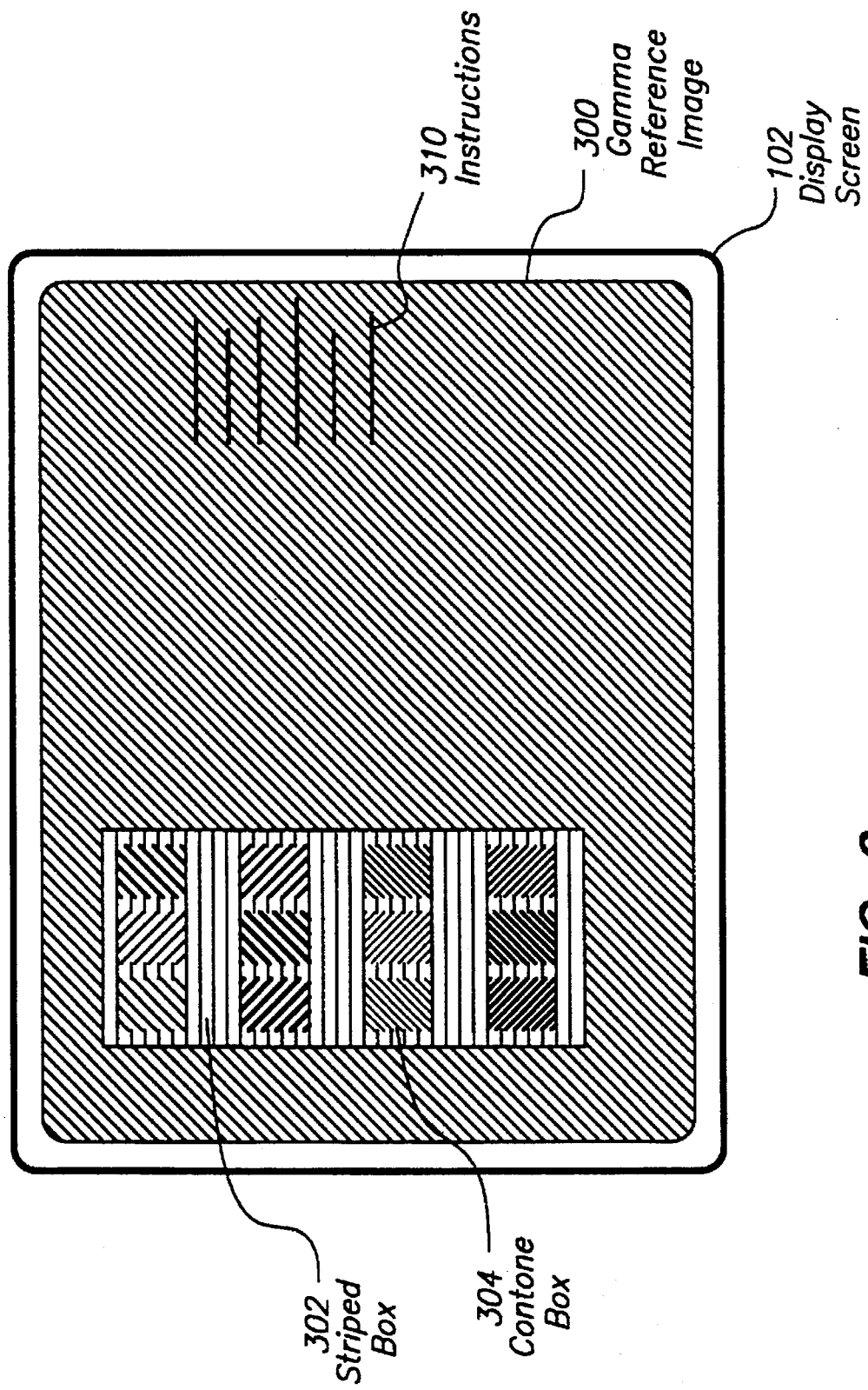
FIG. 3 illustrates a gamma reference image in accordance with the present invention.

Referring now to FIG. 3, there is shown a gamma reference image 300 on display screen 102, in accordance with the present invention. Image 300 includes a striped box 302 and a number of continuous tone boxes, e.g., 304. Gamma is a measure of the relationship between the brightness of color as it appears on display screen 102 and the signal amplitude used by monitor 104 to generate that color. Each of the continuous tone boxes, e.g., 304, displays a different intensity of the same color, for instance blue, and is generated by a known signal amplitude. Striped box 302 is shaded by the full intensity of that color overlaid by a number of closely-spaced black lines. An indication of gamma for the color being displayed is determined by the user selecting which continuous tone box, e.g., 304, most closely matches the brightness of striped box 302. Instructions 310 direct the user to make this choice by placing the display cursor over the matching continuous tone box, e.g., 304, and then clicking the mouse button. The user is also instructed that by squinting and selecting the box that seems to "disappear", this comparison may be made easier. In a preferred embodiment, the user may also click between continuous tone boxes if unable to decide which of two boxes provides the closest match. In order to permit such "in-between" choices, the continuous tone boxes are arranged with increasing color intensity in a serpentine pattern as follows (in this example, with 1 representing the smallest intensity and 12 representing the greatest intensity):

| first row: | 1 | 2 | 3 |
| --- | --- | --- | --- |
| next row: | 6 | 5 | 4 |
| next row: | 7 | 8 | 9 |
| last row: | 12 | 11 | 10 |

Figure 4:
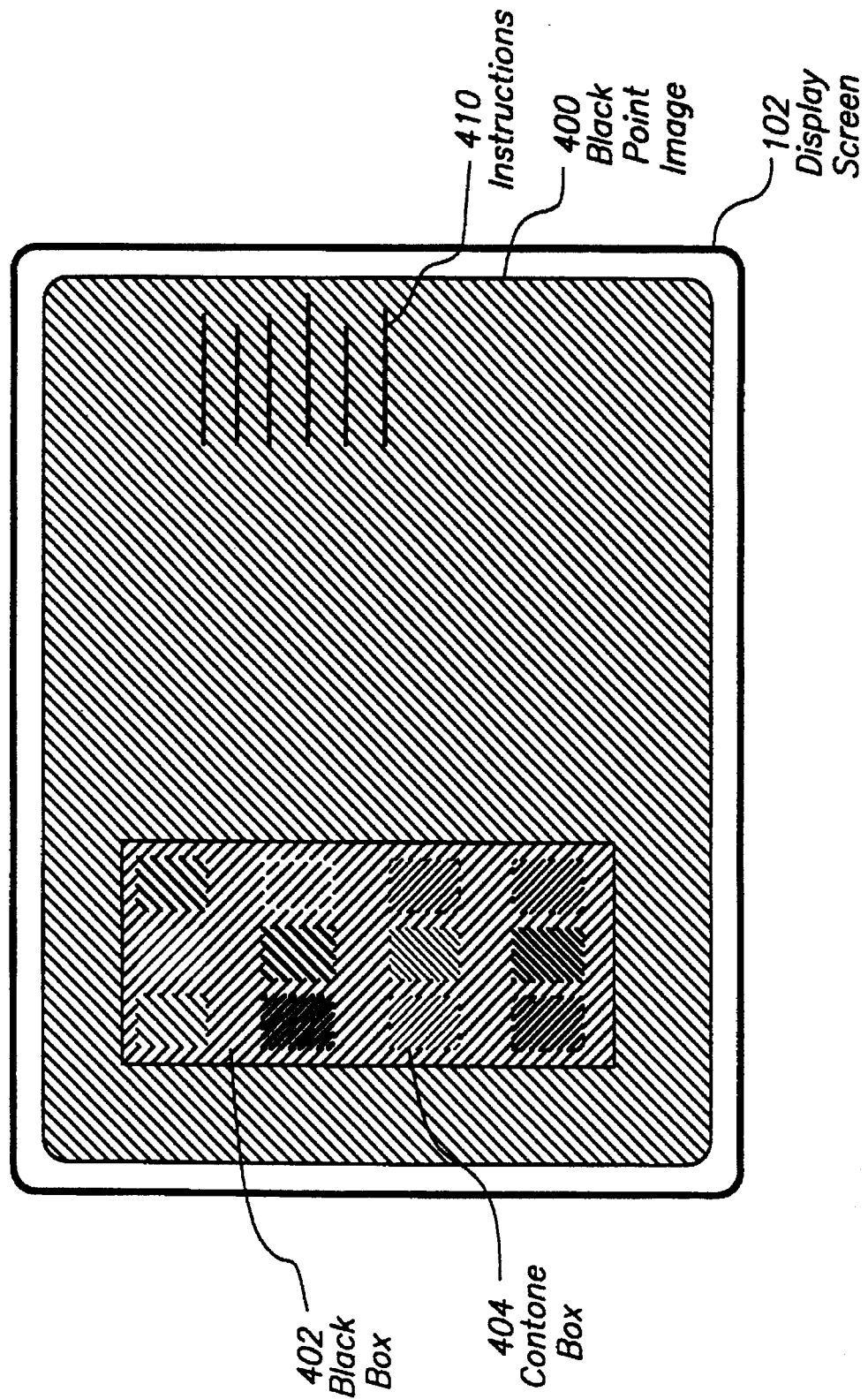
FIG. 4 illustrates a black point reference image in accordance with the present invention.

Referring now to FIG. 4, there is shown a black point reference image 400 on display screen 102, in accordance with the present invention. Image 400 includes a black box 402 and a number of continuous tone boxes, e.g., 404, of varying intensity. Instructions 410 direct the user to select the darkest continuous tone box, e.g., 404, that is identifiable over the black background of black box 402. This selection is used to determine the signal value that corresponds to the black point cutoff for monitor 104 for a particular color.

In a preferred embodiment, the gamma determination discussed in connection with FIG. 3 is performed once again after the black point determination discussed in connection with FIG. 4 with a different amount of black striping in striped box 302 in order to obtain another gamma data point. In a preferred embodiment, the first gamma determination employs black striping that covers ⅓ of striped box 302, and the second gamma determination employs black striping that covers ⅔ of striped box 302.

In a preferred embodiment, the gamma and black point determinations are performed for each of the primary color components used by monitor 104. For standard cathode ray tube computer displays, separate gamma and black point determinations are performed for red, green, and blue color components.

Figure 5:
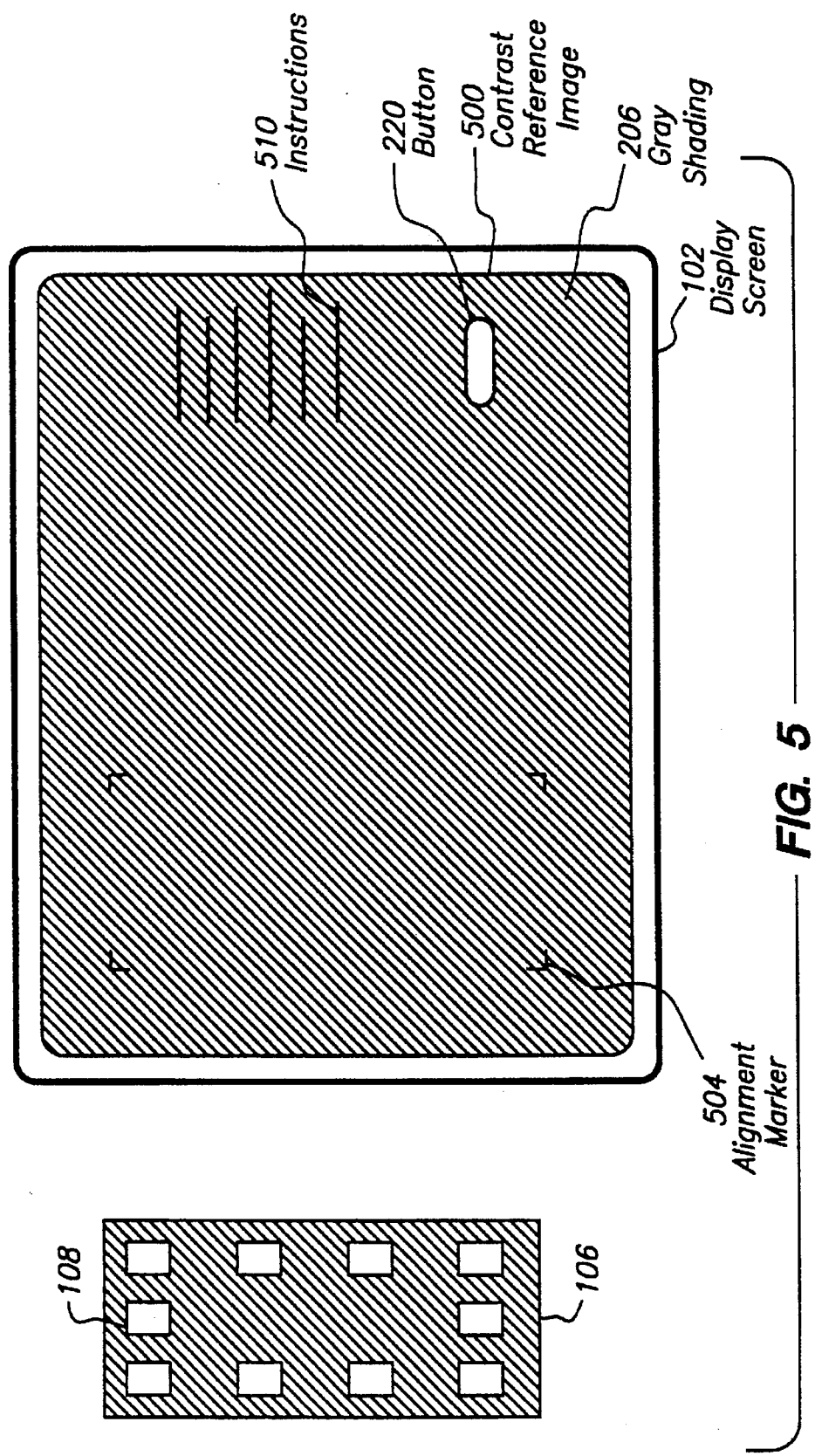
FIG. 5 illustrates a contrast reference image in accordance with the present invention.

Referring now to FIG. 5, there is shown a contrast reference image 500 on display screen 102, as well as a matching card 106, in accordance with the present invention. Image 500 includes a gray shading background 206, card alignment markers 504, instructions 510, and button 220. Instructions 510 direct the user to place card 106 on display screen 102 in the location indicated by alignment markers 504. In a preferred embodiment, card 106 is formed of an opaque material printed with a reference color of known visual characteristics. In a preferred embodiment, reference card is printed with one of two lightness values depending on whether the ambient light illuminating the monitor 104 is primarily incandescent or fluorescent. In one embodiment, a card having a known CIE L* value in the middle range of luminance for a typical monitor is used, and this same L* value is used for cards intended for incandescent and fluorescent lighting. For purposes of the contrast determination described below, the color (i.e., chrominance) value of card 106 need not be known. A card having a relatively neutral chrominance is found to facilitate the contrast determination.

Any suitable material such as cardboard or plastic may be used to form card 106. Any suitable positioning technique may be used to facilitate placement of card 106 over display screen. In a preferred embodiment, a slightly adhesive backing permits secure application of card 106 to display screen 102, yet allows card 106 to be easily removed from display screen 102 without leaving any residue. Alternatively, card 102 may be adapted to be secured to display screen 102 by a static charge, or may be mounted on a frame that fits over monitor 104. As a specific example, an L-shaped arm pivotally mounted to monitor 104 could be used to position card 106 alternately in front of, or out of the way of, display screen 102. As another example, card 106 could be implemented using a shade roller similar to the structure used for conventional window shades.

In yet another embodiment cutouts 108 of card 106 could be covered with a colored transparent film or gel, and the visual characteristics of card 106 could be adjusted correspondingly, to facilitate the visual comparisons described herein. It should be recognized that further modifications and enhancements could also be used in accordance with the present invention.

Referring once again to FIG. 5, instructions 510 direct that once card 106 is affixed to display screen 102, the contrast control of monitor 104 be adjusted until card 106 appears to "blend in" with, i.e., have the same luminance as, the gray shading 206. Once this is accomplished, the user clicks on button 206 to continue.

In one embodiment of the invention, gamma information obtained as described in connection with FIG. 3 is used to modify image 500 to more closely approximate known perceived image characteristics. For instance, if gamma information obtained in connection with use of the image described in FIG. 3 indicates that monitor 104 produces more red light than expected, a gamma correction function is used to reduce the relative amount of red when displaying contrast reference image 500 so that the user perceives a known gray shading 206 rather than one that is corrupted by too much red light.

Figure 6:
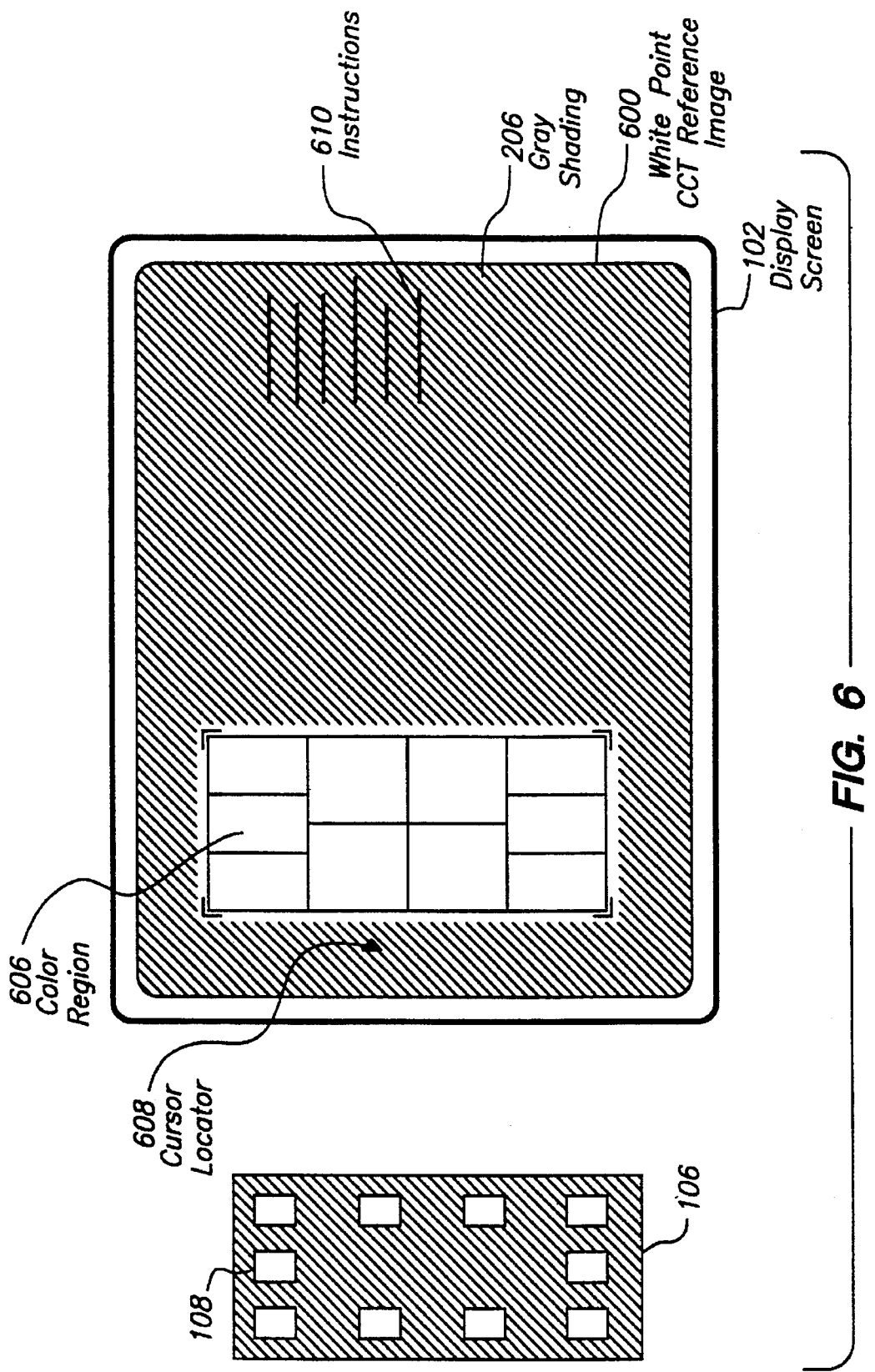
FIG. 6 illustrates a white point temperature reference image in accordance with the present invention.

Referring now to FIG. 6, there is shown a white point temperature reference image 600 on display screen 102, as well as a matching card 106, in accordance with the present image. Image 600 includes instructions 610, a number of color regions, e.g., 606, and a cursor locator 608, as well as gray shading 206. Each color region, e.g., 606, is illuminated with a color representing a different white point or correlated color temperature ("CCT").

In a preferred embodiment, gamma correction as described in connection with FIG. 5 is again used so that gray shading 206 provides a gray of known perceived characteristics and so that each color region, e.g., 606, provides a known CCT.

As background, color displays typically used a combination of color components to produce a color that is considered "white". However, there exists a range of colors that are perceived by the human visual system as "white." These colors, on an absolute scale, range from a pale yellow to a pale blue, and can be precisely specified by standard measurements, for instance CIE chromaticity measurements or a CCT. A color with a specified CCT has the same appearance as an ideal black body heated to the same temperature. The locus of CIE chromaticities of an ideal black body is called the "black body locus." In practice, the locus of daylight does not follow the black body locus, but follows a different locus defined as the CIE "D" series of illuminants under the standard known as CIE 15.2-1986. Color display devices are nominally set to have white points that follow this locus, but can still vary widely over production runs or over time. Therefore accurate display of colors typically requires that the color temperature displayed when the relative amounts of red, green and blue are each set to a value of unity be known. The contrast adjustment described in connection with FIG. 5 brings the luminance value of the display close to a predetermined level in order to facilitate matching of white points (CCTs) as described below.

Instructions 610 direct the user to again make use of card 106. In a preferred embodiment, a single reference card is (one designed for incandescent lighting or one designed for fluorescent lighting) is employed for both the contrast determination discussed in connection with FIG. 5 and the white point determination discussed in connection with FIG. 6. In an alternate embodiment, different cards could be used, one with a reference luminosity for the contrast determination and another with a reference chromaticity for the white point determination.

In an alternate embodiment, a single card for all light sources could also be used by adjusting the characteristics of reference image 600 accordingly.

In any event, card 106 is again affixed to display screen 102 so that each color region, e.g., 606 is viewable through a corresponding cutout, e.g., 108. Instructions 610 direct the user to select the color region, e.g., 606, that most closely matches the color of card 106. As mentioned above, in a preferred embodiment each of the color regions, e.g., 606, is gamma adjusted to a different preset value. The user is requested to point and click on the selected region using the mouse. Since card 106 is covering a rather large portion of screen 600 and the display cursor may be hidden under card 106, a cursor locator 608 is used to point to the color region over which the cursor is currently located.

Card 106 has a known CCT under the prescribed light source so that the user's selection of a color region, e.g., 606 provides an indication of the relative amounts of red, green, and blue light from display screen 102 that are required to match the color reflected from card 106. In a preferred embodiment, card 106 for use with incandescent lighting has a known CCT when viewed under illumination known as "CIE illuminant A" (equivalent to the color emanating from a 100 watt tungsten lamp) and card 106 for fluorescent lighting has the same CCT when viewed under illumination known as "CIE illuminant F2" (equivalent to the color emanating from a "cool white" fluorescent lamp). It should be recognized that additional cards with corresponding properties under other sources of illumination can also be used.

The information on black point, gamma, and white point temperature thus obtained may then be output for the user's information, may be fed back to a color table to adjust the subsequent color output from monitor 102 as desired, may be used to make manual adjustments to the monitor, or may be used to determine whether the monitor is within a predetermined threshold of color accuracy. In a preferred embodiment, this information is used to modify output data sent to other imaging devices connected to computer 106, such as color printers, so that the color of an image on a printed page better matches the color of that image on monitor 102.

In one embodiment, the information is used to yield subsequent color output from monitor 102 that matches some known definition of color expected by the signals driving monitor 102. For instance, an application program running on computer 102 may call for display of a color defined in terms of specific CIE values, and the information obtained as described above can be used to modify the intensity of red, green and blue in monitor 102 to closely match the color.

It should be recognized that not only CRT monitors, but other types of imaging devices such as television receivers, printers, plotters, and cameras could also have color rendering determined and calibrated in accordance with the present invention.

From the above description, it will be apparent that the invention disclosed herein provides a novel and advantageous system and method of color characterization and calibration of a display device. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A system for determining color rendition in an imaging device, comprising:

a brightness reference providing a first black reference area and a first white reference area;

a gamma reference providing a halftone reference area and a continuous tone reference area;

a black point reference providing a second black reference area and a color intensity reference area;

a contrast reference providing a gray reference area;

a white point correlated color temperature reference providing a second white reference area; and a matching card having known visual characteristics under a prescribed light source for comparing with a selected subset of the references.

2. A system as in claim 1, wherein the imaging device is a video display device, the brightness reference is a first image produced by said video display device, the gamma reference is a second image produced by said video display device, the continuous tone reference area includes a plurality of continuous tone subregions of varying intensity, the black point reference is a third image produced by said video display device, the color intensity reference area includes a plurality of color subregions of varying intensity, the contrast reference is a fourth image produced by said video display device, the white point correlated color temperature reference is a fifth image produced by said video display device, the white reference area includes a plurality of subregions each corresponding to a different correlated color temperature, and the matching card includes a cutout area, the matching card further being disposed for placement over a selected subset of said images to allow simultaneous viewing of one of said selected subset and the matching card.

3. A method of determining color rendition in an imaging device, comprising:

using the imaging device to provide a brightness reference having a first black reference area and a first white reference area;

using the imaging device to provide a gamma reference having a halftone reference area and a continuous tone reference area, and making a comparison therebetween;

using the imaging device to provide a black point reference having a second black reference area and a color intensity reference area, and making a comparison therebetween;

using the imaging device to provide a contrast reference having a gray reference area;

using the imaging device to provide a white point correlated color temperature reference having a second white reference area; and making a comparison between a subset of said references and a matching card having known visual characteristics under a prescribed light source.

4. A method as in claim 3, further comprising adjusting characteristics of said imaging device responsive to the results of said comparisons.

5. A method as in claim 3, wherein the visual characteristics of the matching card are known for each of a plurality of ambient lighting conditions, and wherein visual characteristics of the white point correlated color temperature reference are adjusted in response to a prevailing one of said plurality of ambient lighting conditions.

6. A method as in claim 5, further comprising selecting a known white point correlated color temperature for said imaging device in response to results from said comparison of said subset of references with said matching card.

7. A method as in claim 3, further comprising adjusting said imaging device to provide a known correlated color temperature in response to said comparison of said subset of references with said matching card.

8. A system as in claim 1, wherein the visual characteristics of the matching card are known for each of a plurality of ambient lighting conditions, and wherein visual characteristics of the white point correlated color temperature reference are adjusted in response to a prevailing one of said plurality of ambient lighting conditions.

9. A system as in claim 8, further comprising determining an known white point correlated color temperature for said imaging device in response to said comparison of said subset of references with said matching card.

10. A system as in claim 1, further comprising adjusting said imaging device to provide a known correlated color temperature in response to said comparison of said subset of references with said matching card.

11. A system for determining color rendition in an imaging device, comprising:

a reference area; and a matching card having known visual characteristics at each of a plurality of ambient lighting conditions, for comparing with the reference area to determine imaging parameter values of the imaging device under a prevailing one of the plurality of ambient lighting conditions.

12. A method of determining color rendition in an imaging device, comprising:

using the imaging device to provide a visual reference area;

providing a matching card having known visual characteristics under each of a plurality of ambient lighting conditions;

making a comparison between said visual reference area and said matching card; and determining color rendition in the imaging device in response to said comparison.

13. A method as in claim 12, further comprising adjusting said imaging device in response to said determining, in order to obtain from the imaging device a set of known and desired visual characteristics.

14. A system as in claim 1, wherein the contrast reference is gamma adjusted, the white point correlated color temperature reference is gamma adjusted to provide the second white reference area with known perceived color characteristics, and the matching card has a known white point correlated color temperature under the prescribed light source.

15. A method as in claim 3, wherein the gray reference area is adjusted to known perceived color characteristics, the white point correlated color temperature reference is gamma adjusted to provide the second white reference area with known perceived color characteristics, and the matching card has a known white point correlated color temperature under the prescribed light source.

16. A system as in claim 11, wherein the reference area is gamma adjusted to be of known perceived color characteristics.

17. A method as in claim 12, wherein the visual reference area is gamma adjusted to be of known perceived color characteristics.

18. A method as in claim 12, further comprising adjusting said imaging device in response to said determining, in order to obtain from the imaging device subsequent color output that matches an expected color definition.

\* \* \* \* \*